United States Patent
Wang et al.

(10) Patent No.: US 9,277,208 B2
(45) Date of Patent: Mar. 1, 2016

(54) SYSTEM AND METHOD FOR ESTIMATING QUALITY OF VIDEO WITH FRAME FREEZING ARTIFACTS

(71) Applicant: OOVOO, LLC, New York, NY (US)

(72) Inventors: Yao Wang, Brooklyn, NY (US); Chang Feng, Belle mead, NJ (US); Yuanyi Xue, Brooklyn, NY (US)

(73) Assignee: OOVOO, LLC, New York, NY (US)

( * ) Notice: Subject to any disclaimer, the term of this patent is extended or adjusted under 35 U.S.C. 154(b) by 132 days.

(21) Appl. No.: 14/078,087

(22) Filed: Nov. 12, 2013

(65) Prior Publication Data
US 2015/0130952 A1    May 14, 2015

(51) Int. Cl.
*H04N 17/00* (2006.01)
*H04N 17/02* (2006.01)
*H04N 19/44* (2014.01)

(52) U.S. Cl.
CPC ............. *H04N 17/004* (2013.01); *H04N 19/44* (2014.11)

(58) Field of Classification Search
CPC ....... H04N 17/004; H04N 19/44; G06K 9/46; G06K 9/6255; G06K 9/66
USPC ................................................. 348/192, 180
See application file for complete search history.

(56) References Cited

U.S. PATENT DOCUMENTS

| | | | |
|---|---|---|---|
| 6,377,297 B1 * | 4/2002 | Janko et al. | 348/180 |
| 2007/0242163 A1 * | 10/2007 | Stevens | 348/702 |
| 2009/0128633 A1 * | 5/2009 | Chapman | 348/180 |
| 2009/0273678 A1 * | 11/2009 | Huynh-Thu et al. | 348/180 |
| 2010/0053336 A1 * | 3/2010 | Bourret | 348/180 |

* cited by examiner

*Primary Examiner* — Michael Lee
(74) *Attorney, Agent, or Firm* — McDermott Will & Emery LLP

(57) ABSTRACT

A method and system that assesses video quality of transmitted video packet signals suffering from packet loss and delay. This packet loss and delay can create freeze events, which are observed as a jerkiness while viewing the video. The system and method compares the frames in a video transmission to determine freeze events; extracts a set of features from the locations of the freeze events and decoded video frames; and maps the set of features into a video quality score using a neural network. The video quality score provides an assessment of the effects of irregular frame freezes due to packet loss or delay on the quality of the video.

17 Claims, 5 Drawing Sheets

SYSTEM AND METHOD FOR ESTIMATING QUALITY OF VIDEO WITH FRAME FREEZING ARTIFACTS

TECHNICAL FIELD

The present invention relates generally to video transmission systems and specifically to methods and systems for video transmission over fixed and/or mobile packet networks.

BACKGROUND

Typical video transmission systems generally include a video encoder, a transmission method (e.g. the Internet, LANs, and/or telephone lines), and a video decoder. Video transmission systems are generally used to transfer voice, video, and/or other data between remote parties. Video transmission may include live streaming, which allows remote parties to transmit and receive video transmission in real time, and video teleconferencing (also referred to as video conferencing), which allows two or more remote parties to participate in a discussion.

Data transmitted in a video transmission system may be formatted in data packets rather than bit streams for transmission over a network. Each packet may contain a frame of the video. When compressing the video data into frames, inter-frame or intra-frame compression can be used. Inter-frame compression means that each frame references surrounding frames in order to produce images in the proper order. Intra-frame compression creates frames that contain all information needed to produce an image temporally.

Due to packet loss or delay, the received video quality can suffer over fixed and/or mobile packet networks. This reduced video quality is exemplified by the artifact of frame freezing and the consequent temporal jerkiness observed by the receiving party. In applications with a low delay requirement, such as live streaming or video conferencing, any frame that is not completely received by its display deadline is considered lost and may require that the receiver choose an error concealment method to recover the frame. One error concealment method displays the previous frame that was correctly received in place of the lost frame. But in such cases, the subsequent frames to the lost frame, if predictively coded using the previous frame, will have a decoding error even if correctly received. In order to avoid this error propagation problem, all subsequent frames after a lost frame must also be replaced by the last correctly received frame until the next intra-frame is received. This artifact is referred to as "frame freeze due to packet loss." In applications allowing more elastic delay, such as streaming of pre-coded video, when a frame arrives past its display deadline, the receiver continuously displays the previous frame, until the actual new frame arrives. This artifact is referred to as "frame freeze due to packet delay." Both artifacts manifest as temporal jerkiness on the received video.

Video quality metrics may be used to evaluate the impact of frame freezing due to either packet loss or packet delay. There are several methods and systems for measuring the impact of frame freeze on the perceived quality of video. These methods and systems fall into two categories called reference video quality metrics and no-reference video quality metrics (NR metrics). Reference video quality metrics provide a quality assessment based on a comparison of the transmitted or degraded video with the original pristine reference video at the receiver. NR metrics evaluate the quality of the video based solely on the transmitted or degraded video only. NR metrics are important for quality assessment in real applications, as the pristine video is often not available at the receiving device.

Previous use of NR metrics has been based on the duration of each freeze event and the number of freeze events. However, these are not dependent on the video content and are undesirable since, for different video characteristics, the same freeze frame pattern could have different impacts on the quality.

Another version of this NR metric utilizes a more advanced version of frame detection that uses the squared value of the 1-step frame differences and adding an extra encoding pass for the received video. This version uses different thresholds according to frame types of neighboring frames after that additional encoding. By using a non-zero and dynamic threshold, the system becomes more robust because there are less false freeze frame positives. While providing more accurate frame freeze detection, this method is too complex for use in a real-time system. Finally, the NR metric standardized by ITU-T, which relies on packet header information, estimates the frame freezing quality degradation by calculating the ratio of the number of damaged video frames and the total number of video frames as well as the packet loss event frequency. This ITU-T metric also does not consider the video content characteristic nor does it differentiate between random individual frame drops and consecutive frame losses.

The present system and method utilizes a more robust method of extracting video features and mapping these features onto a pre-trained neural network in order to provide a video metric. The present system and method operates directly on the video content and explicitly considers the differences in the video content for more accurate video quality metrics. Further, it provides more consistent results than prior art by using a pre-trained neural network to provide the final video quality assessment. The present system and method provides a NR metric with low complexity that can be utilized with real time processing constraints.

SUMMARY

The examples of the present invention that are described herein below provide methods, systems, and software for use in packet-based video transmission. These methods permit both fixed and/or mobile client devices to exchange video images and audio data via a transmission method (e.g. the Internet). Both multiple-point transmission including a server and point-to-point transmission are supported. The video transmission system includes a video encoder that produces the video packets that are transmitted over the transmission method, such as the Internet. These packets can go directly to a single receiving device or to a server, which receives and transmits the packets to other receiving devices. The receiving devices use a video decoder to reassemble the packets and reproduce the original video. In case packets are lost or delayed, the received video may suffer from frame freezing. An example of the present system and method allows a quantifiable measurement of frame freezing and its relation to the subjective quality of the video presentation.

An object of the disclosed system and method is to provide a NR metric for video transmission that explicitly considers differences in video content by measuring motion information features. This may be accomplished by providing a system and method whereby once the freeze frame locations of a received video have been determined, a number of motion information features of the received video and related freeze events are extracted.

A second object of the disclosed system and method is to provide a NR metric for video transmission that does not rely on header information. This may be accomplished by providing a system and method whereby the received video is analyzed by directly comparing the frames of the received video rather than using header information.

A third object of the disclosed system and method is to provide a NR metric for video transmission that finds a mapping relation between the freeze event and motion information features and perceived quality of the degraded video using a pre-trained neural network. This may be accomplished by a providing a system and method whereby the freeze event and motion information features of the received video are used as input to a feature selection module to determine the optimal subset of freeze event and motion information features. The optimal subset of features is then mapped onto a video quality score using a pre-trained neural network that is trained based on a subjective test video database.

The present system and method will be more fully understood from the following detailed description of the examples thereof, taken together with the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies described herein generally relate to video transmission and more specifically to methods and systems for video transmission over packet networks with end points, such as personal computers and mobile devices. The method and system described herein may be used to detect freeze frames (also known as freeze events) by comparing frame differences against a non-zero dynamic threshold, extracting features from the freeze events based on, for example, the freeze event pattern and actual video content, and mapping the extracted features onto a trained pre-trained neural network to provide a metric that is predictive of the subjective video quality.

Figure 1:
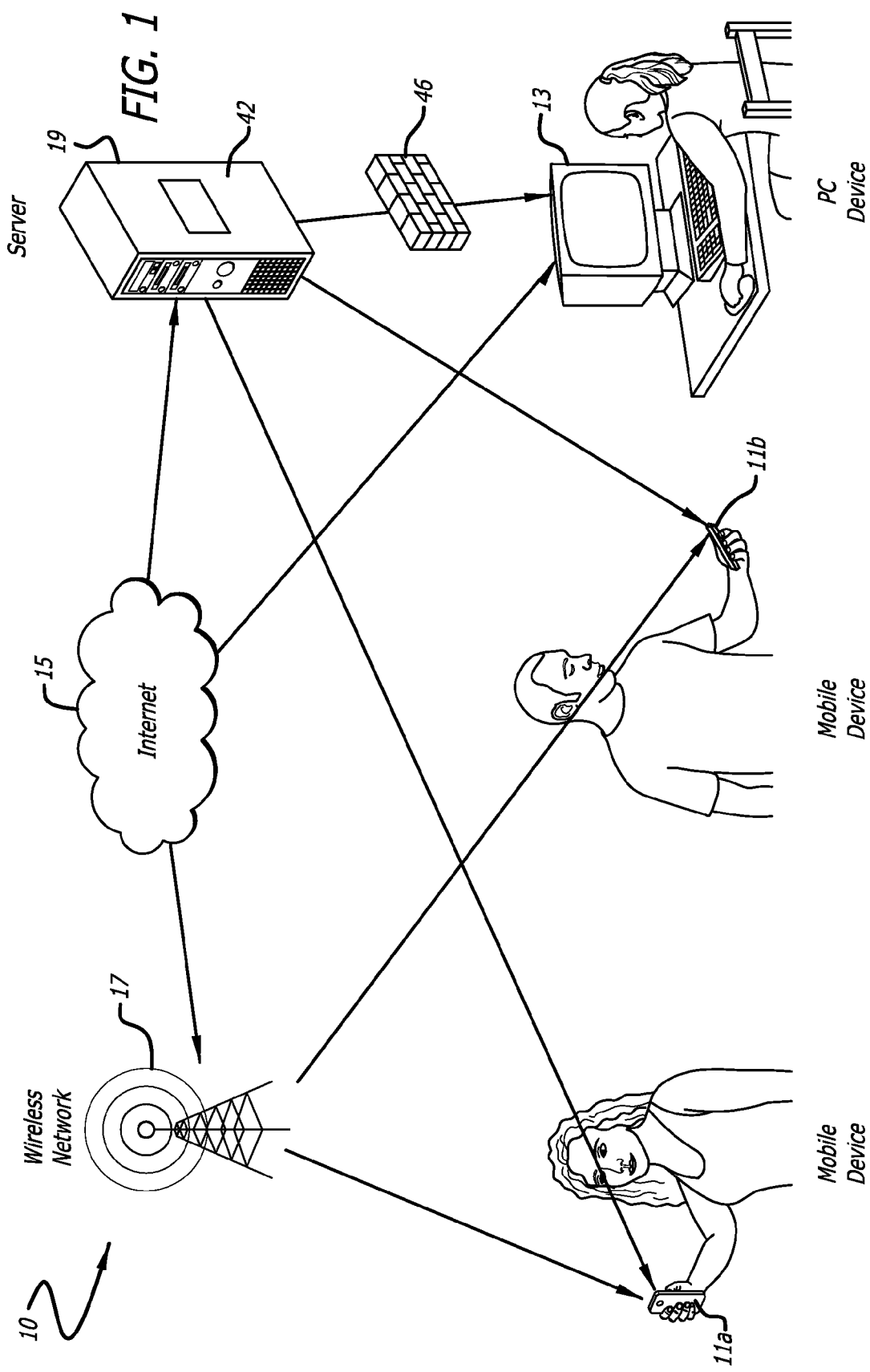
FIG. 1 shows a schematic, pictorial illustration of a system for video transmission between mobile and fixed client devices, in accordance with an example of the present system.

FIG. 1 illustrates a high-level schematic of one example of a video transmission system 10 for video transmission between multiple devices, for example one or more mobile devices 11a, 11b (generally referred to as 11) and one or more personal computer (PC) fixed devices 13. Each fixed device 13 and mobile device 11 are capable of encoding and decoding video transmissions. The mobile devices 11 may send data and communicate over the Internet 15 with other devices mobile 11 and fixed devices 13 via a wireless communications network 17. The wireless communications network 17 may be a long range network, such as a 3G network, 4G network, or LTE network, a short range network, such as WiFi or Bluetooth, or any other network protocol or be combination of such networks. In the case of some wireless communications networks, a wireless network tower may also be used. As shown in FIG. 1, logically each device may communicate with each other by sending data to and receiving data from a server 19. In one example, the server 19 may be an audio server, a video server, or an audio/video server. It is also understood that the system may include one or more dedicated servers, such as a dedicated audio server and a dedicated video server. The functionality of the server 19 may also be incorporated into other network devices as known to those of ordinary skill in the art.

Generally, the server 19 includes a processor 42, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The I/O devices may include input devices, for example but not limited to, a keyboard, mouse, scanner, microphone, touch screens, bar code readers, stylus, laser readers, radio-frequency device readers, etc. Furthermore, the I/O devices may also include output devices, for example but not limited to, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The processor 42 is a hardware device for executing software, particularly software stored in memory. The processor can be any custom made or commercially available processor, a central processing unit (CPU), an auxiliary processor among several processors associated with the server 19, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation.

The memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. The memory can have a distributed architecture where various components are situated remote from one another but can also be accessed by the processor.

The software in memory may include one or more separate programs, each of which comprises an ordered listing of executable instructions for implementing logical functions. An example of suitable commercially available operating systems is Windows operating system available from Microsoft Corporation. The operating system controls the execution of the present video quality metric computer program. It is understood that other operating systems may also be utilized without departing from the spirit of the system and method disclosed herein.

If the server 19 is a PC or workstation, the software in the memory may further include a basic input output system (BIOS). The BIOS is a set of essential software routines that initialize and test hardware at startup, start the O/S, and support the transfer of data among the hardware devices. The BIOS is stored in ROM so that the BIOS can be executed when the server 19 is activated.

Video transmission may require real-time, two-way transmission of video and audio data. In the Internet environment, the real-time two-way transmission may be complicated by intermediary components, such as a firewall 46. Firewalls 46 are typically used, as is known in the art, to prevent malicious traffic on the Internet 15 from reaching mobile devices 11 and fixed devices 13. As a result, the firewall 46 may prevent packets that are sent using simple, connectionless transport level protocols, such as the User Datagram Protocol (UDP), from reaching computer 13. UDP could otherwise be used conveniently and efficiently for transmitting real-time data. Other sorts of intermediary components, such as proxy servers (not shown), may cause similar sorts of problems. In such cases, it may be necessary for the server to use a connection-oriented transport level protocol, such as the Transmission Control Protocol (TCP), or possibly even a secure socket to transmit audio and video data downstream to the client computer.

Server 19 may be configured to determine the appropriate and most efficient transport layer protocol to use for each client computer for a given video transmission. The server may thus use TCP, with or without a secure socket, to communicate with one mobile device 11 or fixed device 13 in a given conference, while using UDP to communicate with another mobile device 11 or fixed device 13 in the same conference. The devices are typically not aware of these differences in transport layer protocol. Thus, system 10 may support both point-to-point and multipoint-to-multipoint conferences in which different client computers simultaneously use different transport layer protocols.

When the server 19 is in operation, the processor 42 is configured to execute software stored within the memory, to communicate data to and from the memory, and to generally control operations of the server 19 based on the software. Processor 42, mobile device 11, and/or fixed device 13 perform the functions, as described herein, under the control of a video quality metric computer program, which may be downloaded in electronic form (over a network, for example), or may be provided on tangible media, such as optical, magnetic or electronic memory media.

The video quality metric computer program with support and compliance capabilities may be a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, the video quality metric computer program with support and compliance capabilities can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In one example, the video quality metric computer program with support and compliance capabilities is written in C++. The video quality metric computer program may be stored at any location in the present system, including server 19, mobile device 11, and/or fixed device 13.

Figure 2:
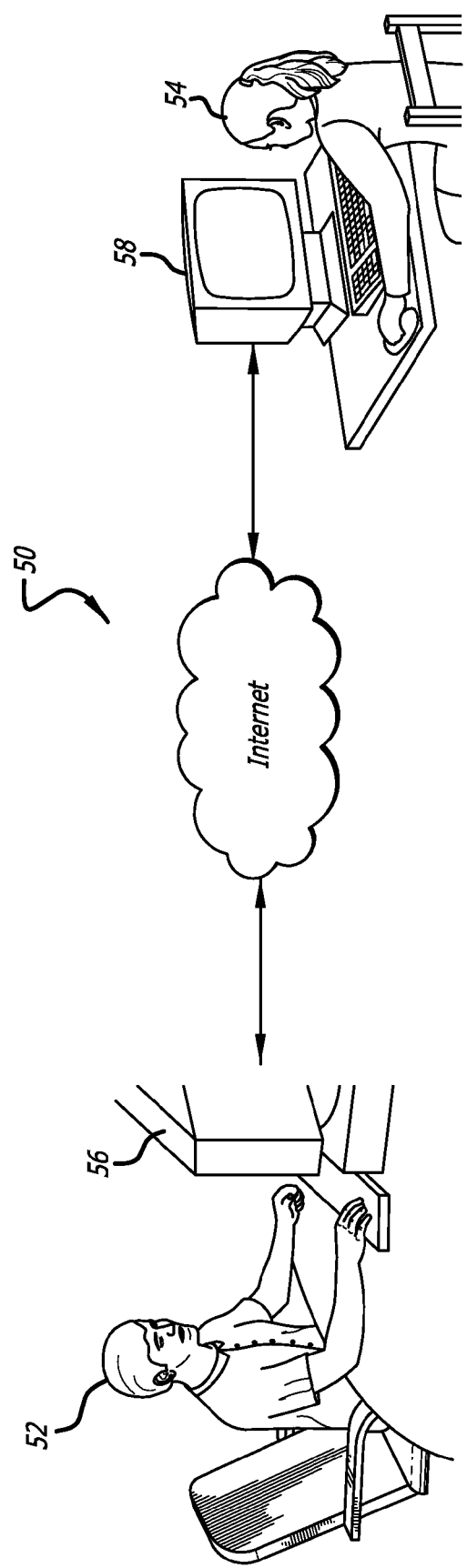
FIG. 2 shows a schematic, pictorial illustration of a system for video teleconference, in accordance with another example of the present system.

FIG. 2 is a schematic, pictorial illustration of a system 50 for a video transmission system, in accordance with another example of the present system. In this example, users 52 and 54 of respective computers 56 and 58 participate in a point-to-point video transmission over network 36, with computer 56 acting as both client and server. The principles of this example may similarly be applied in multipoint-to-multipoint video transmission, as long as the computer acting as the server has sufficient computing power to support multiple clients.

Although the methods that are described herein make reference specifically, for the sake of clarity, to the elements of system 10 (FIG. 1), these methods may likewise be applied, mutatis mutandis, in system 50, as well as in other point-to-point, point-to-multipoint, and multipoint-to-multipoint video transmission topologies.

Figure 3:
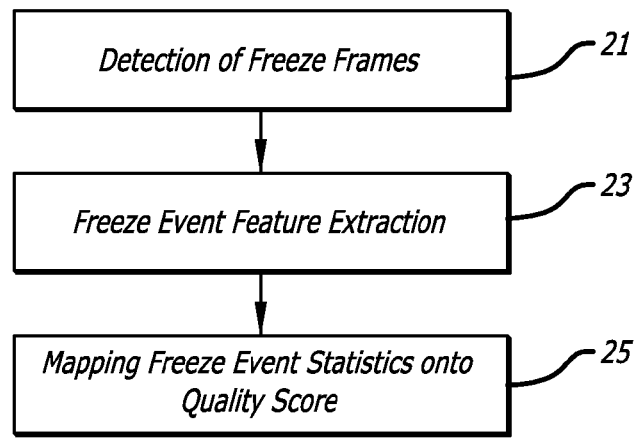
FIG. 3 shows a flow chart that schematically illustrates a system for locating freeze events, extracting freeze event and motion information features, and determining video quality.

FIG. 3 is a flow chart that schematically illustrates a system for estimating video transmission quality, in accordance with an example of the present system. The system is initiated when a receiving device receives a video transmission. After decoding the video transmission to create decoded video frames, the receiving device detects freeze frames 21. The present system then extracts a set of freeze event and motion information features 23 from the decoded video frames and the freeze frames. This set of features is then mapped onto a quality score 25 by a pre-trained neural network. Each of these steps is described herein.

Figure 4:
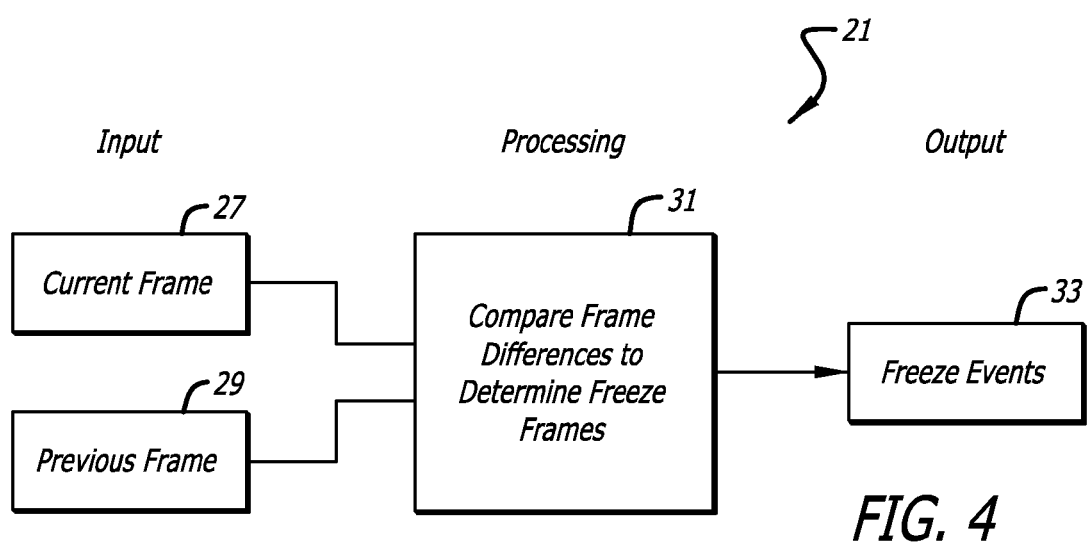
FIG. 4 shows a flow chart that schematically illustrates a system for comparing frame differences in order to find freeze events.

FIG. 4 is a flow chart that schematically illustrates a system for detecting freeze frames in accordance with an example of the present system. One known method to find freeze frames is to examine the 1-step frame difference for each frame and label the frames that have zero frame difference as freeze frames. However, in practice, this method is often computed from the captured video frames rendered on the display screen. In such cases, there could be small differences between displayed duplicated frames.

The present example compares the difference between frames to a non-zero dynamic threshold. It calculates the motion energy time history for each 1-step frame on the Y channel. Using the decoded video frames, each pixel in the current frame 27 and the previous frame 29 are compared for differences. Then the differences that have an amplitude less than or equal to an image motion threshold are eliminated. This eliminates low level noise. Of the remaining differences, the amplitudes are squared. Then the mean of each squared amplitude is taken, outputting the time history of frame-by-frame values that contain the motion energy.

Then, the present example compares the motion history to detect freeze frames 31. The mean of the value of the time history is used to determine the mean level of motion in a 1-step frame. This creates a dynamic threshold based on the video content that helps avoid false positives freeze frames. For instance, the system is sensitive to scenes that are very still (e.g. a zoomed out version of a still meadow) and those with large amounts of motion (e.g. a car chase). By comparing the time history of frame-by-frame values to this dynamic threshold, freeze frames 31 are detected. An advantage of this system is that it does not rely on header information to determine missing or delayed packets. The freeze frames are passed on to the feature extraction system 23 as freeze events 33.

Figure 5:
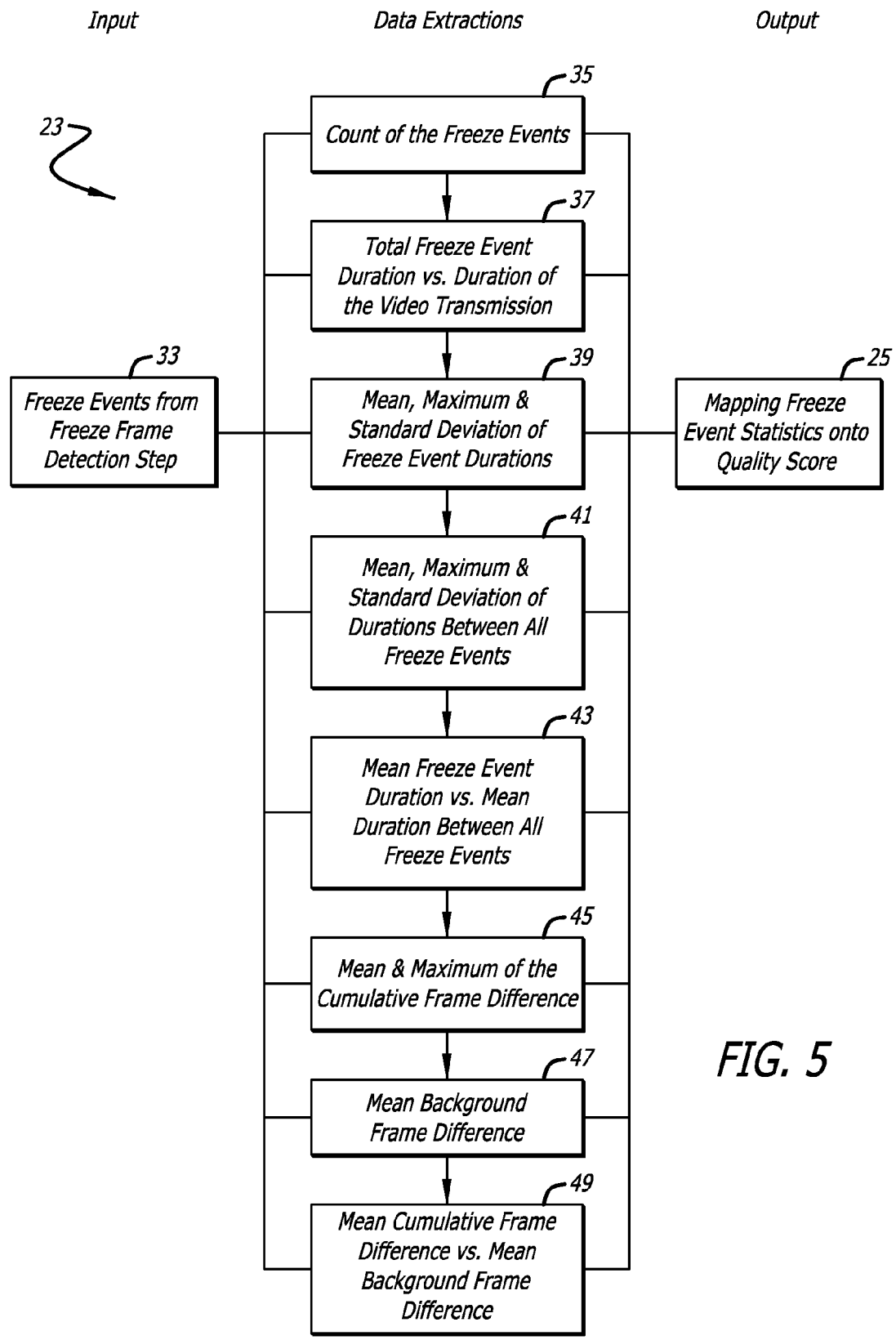
FIG. 5 shows a flow chart that schematically illustrates a system for extracting freeze event and motion information features used to determine video quality.

FIG. 5 is a flow chart that schematically illustrates a system for extracting freeze event and motion information features of the received video transmission and related freeze events, in accordance with an example of the present system. Freeze events 33 are designated as each consecutive set of freeze frames 31. In the present example, thirteen features 23 are extracted from the received video and related freeze events. The features 23 include those dependent on freeze event patterns and those related to the received video content.

To extract the freeze event features, the system calculates the duration (in terms of number of frames) of each freeze event 33, and the duration (also in number of frames) between every two adjacent freeze events 33. In the present example, the freeze event features include the count of the freeze events 35 for the whole video transmission as well as the mean, maximum, and standard deviation of the duration 39 of each freeze event. It also extracts the mean, maximum, and standard deviation of the duration between all freeze events 41. Two ratios are extracted: the ratio of the total duration of freeze events versus the total duration of the received video 37 and the ratio of the mean freeze event duration versus the mean inter-freeze duration 43. These features depend only on freeze event patterns and do not depend on the actual video content.

The present example also extracts features related to the video content based on motion information. The motion information may include cumulative freeze frame difference. Cumulative freeze frame difference refers to a spike in frame differences immediately after a freeze event. This difference is related to the residual motion that accumulates during a freeze event and is proportional to the duration of the freeze event as well as the actual motion during the freeze. The present system extracts the mean and maximum of the cumulative freeze frame differences 45. The present example also estimates the mean background frame difference of the original, non-frozen video transmission. To estimate the mean background frame difference 47, the system takes the mean of the frame differences over all decoded video frames, excluding both the freeze event regions and scene cut regions. In the present example, a frame is considered a scene cut if the 1-step frame difference of the current frame is larger than five times the mean frame difference of the previous five frames. Obviously, other systems and methods known by those of skill in the art to determine a scene cut region could also be used. Finally, the ratio of the mean cumulative freeze frame difference versus the mean background frame difference 49 is extracted.

Figure 6:
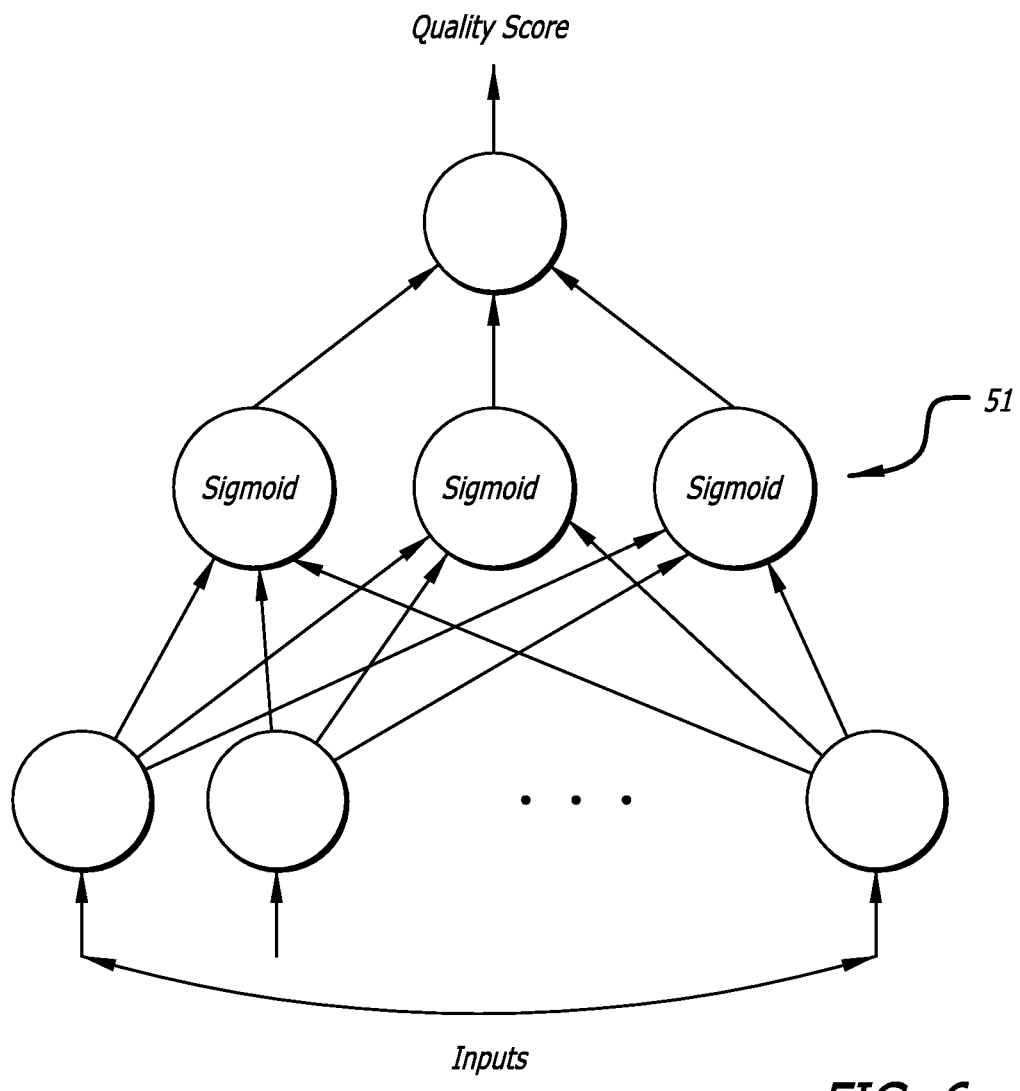
FIG. 6 shows a schematic, pictorial illustration of a pre-trained neural network with one hidden layer, in accordance with an example of the present system and method.

Instead of using a preset function to map the extracted features to the quality score, one example of the present system utilizes a pre-trained neural network. In one pre-trained neural network used with the present system, the network weights are trained based on a subjective test video database including a set of videos with their corresponding mean opinion scores obtained from subjective tests. FIG. 6 shows an example of neural network architecture. The architecture of the neural network, including the number hidden layer neurons 51, can be optimized to increase performance of the present system and method. The optimization of pre-trained neural network architecture based on number of samples is also well known in the art. Further, feature selection and neural network parameter optimization is well known in the art. Using the pre-trained neural network to map the selected features, the present system and method is able to provide a quality score to assess the effect of frame freeze.

While the foregoing has described what are considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A computer program product, comprising a non-transitory computer usable medium having a computer readable program code embodied therein, said computer readable program code adapted to be executed to implement a method for providing a video quality metric, said method comprising:
   decoding a video transmission to create decoded video frames;
   detecting a freeze frame by determining whether differences in adjacent decoded video frames are greater than a threshold;
   extracting a set of features from the freeze frames and decoded video frames; and
   mapping the set of features into a quality score by using a pre-trained neural network.

2. The computer program product according to claim 1, wherein the threshold is non-zero.

3. The computer program product according to claim 2, wherein the threshold is dynamic.

4. The computer program product according to claim 1, wherein the set of features is based on a frame difference on a Y channel.

5. The computer program product according to claim 4, wherein the set of features is based on a pattern of the freeze frames and a content of the decoded video frames.

6. The computer program product according to claim 5, wherein the set of features includes at least one of a count of the freeze frames, a mean duration of the freeze frames, a maximum duration of the freeze frames, a standard deviation of the duration of the freeze frames, a mean duration between the freeze frames, a maximum duration between the freeze frames, a standard deviation of the duration between the freeze frames, a ratio of the total duration of the freeze frames to the total duration of the decoded video frames, a ratio of the mean freeze frame duration to the mean duration between the freeze frames, a mean cumulative freeze frame difference, a maximum cumulative freeze frame difference, a mean background frame difference of the decoded video frames, or a ratio of the mean cumulative freeze frame difference versus the mean background frame difference.

7. The computer program product according to claim 1, wherein the pre-trained neural network comprises at least one hidden layer of neurons.

8. A method for generating a video quality metric, said method comprising:
   decoding a video transmission to create decoded video frames;
   detecting a freeze frame by determining whether differences in adjacent decoded video frames are greater than a threshold;

extracting a set of features from the freeze frames and decoded video frames; and mapping the set of features into a quality score by using a pre-trained neural network.

9. The method according to claim 8, wherein the threshold is non-zero.

10. The method according to claim 9, wherein the threshold is dynamic.

11. The method according to claim 8, wherein the set of features is based on a frame difference on a Y channel.

12. The method according to claim 11, wherein the set of features is based on a freeze frame pattern and a content of the video transmission.

13. The method according to claim 12, wherein the set of features includes at least one of a count of the freeze frames, a mean duration of the freeze frames, a maximum duration of the freeze frames, a standard deviation of the duration of the freeze frames, a mean duration between the freeze frames, a maximum duration between the freeze frames, a standard deviation of the duration between the freeze frames, a ratio of the total duration of the freeze frames to the total duration of the decoded video frames, a ratio of the mean freeze frame duration to the mean duration between the freeze frames, a mean cumulative freeze frame difference, a maximum cumulative freeze frame difference, a mean background frame difference of the decoded video frames, or a ratio of the mean cumulative freeze frame difference versus the mean background frame difference.

14. The method according to claim 8, wherein the pre-trained neural network comprises at least one hidden layer of neurons.

15. A computer program product, comprising a non-transitory computer usable medium having a computer readable program code embodied therein, said computer readable program code adapted to be executed to implement a method for providing a video quality metric, said method comprising:

decoding a video transmission to create decoded video frames;

detecting a freeze frame determining whether differences in adjacent decoded video frames are greater than a non-zero and dynamic threshold;

extracting a set of features from the freeze frames and decoded video frames, wherein the set of features is based on a pattern of the freeze frames and a content of the video transmission; and mapping the set of features into a quality score by using a pre-trained neural network.

16. The computer program product according to claim 13, wherein the set of features is based on a frame difference on a Y channel.

17. The computer program product according to claim 13, wherein the pre-trained neural network comprises at least one hidden layer of neurons.

* * * * *